US012608624B2

(12) United States Patent
Wang et al.

(10) Patent No.: US 12,608,624 B2
(45) Date of Patent: Apr. 21, 2026

(54) METHOD, DEVICE, AND PROGRAM PRODUCT FOR MANAGING KNOWLEDGE GRAPHS

(71) Applicant: Dell Products L.P., Round Rock, TX (US)

(72) Inventors: Zijia Wang, WeiFang (CN); Jiacheng Ni, Shanghai (CN); Jinpeng Liu, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 1088 days.

(21) Appl. No.: 17/583,764

(22) Filed: Jan. 25, 2022

(65) Prior Publication Data

US 2023/0206084 A1     Jun. 29, 2023

(30) Foreign Application Priority Data

Dec. 24, 2021     (CN) .......................... 202111597072.5

(51) Int. Cl.
*G06N 5/022* (2023.01)
(52) U.S. Cl.
CPC .................................... *G06N 5/022* (2013.01)
(58) Field of Classification Search
CPC .............................. G06N 5/022; G06N 20/00
See application file for complete search history.

(56) References Cited

U.S. PATENT DOCUMENTS

2019/0155926 A1*    5/2019    Scheideler ............ G06F 16/215

OTHER PUBLICATIONS

Deng, Songgaojun, Huzefa Rangwala, and Yue Ning. "Dynamic knowledge graph based multi-event forecasting." In Proceedings of the 26th ACM SIGKDD international conference on knowledge discovery & data mining, pp. 1585-1595. 2020. (Year: 2020).*
Jung, Jaehun, Jinhong Jung, and U. Kang. "T-gap: Learning to walk across time for temporal knowledge graph completion." arXiv preprint arXiv:2012.10595 (2020). (Year: 2020).*

(Continued)

*Primary Examiner* — Kamran Afshar
*Assistant Examiner* — Kyle Allman Thompson
(74) *Attorney, Agent, or Firm* — Ryan, Mason & Lewis, LLP

(57)     ABSTRACT

The present disclosure relates to a method, a device, and a program product for managing knowledge graphs. In a method, a historical sequence of knowledge graphs is obtained, wherein the historical sequence includes a plurality of historical knowledge graphs respectively associated with a plurality of historical time points, and a historical knowledge graph in the plurality of historical knowledge graphs includes a plurality of nodes and at least one edge between the plurality of nodes. Based on nodes and edges included in the plurality of historical knowledge graphs, a plurality of subgraphs respectively associated with the plurality of historical knowledge graphs are determined. A sequence feature associated with the historical sequence of the knowledge graphs is determined based on the plurality of subgraphs. A prediction model is trained based on the sequence feature such that the prediction model can describe the correlation among the plurality of historical knowledge graphs.

20 Claims, 6 Drawing Sheets

(56) References Cited

OTHER PUBLICATIONS

Chami, Ines, Adva Wolf, Da-Cheng Juan, Frederic Sala, Sujith Ravi, and Christopher Ré. "Low-dimensional hyperbolic knowledge graph embeddings." arXiv preprint arXiv:2005.00545 (2020). (Year: 2020).*

Jin, Di, Meng Ge, Liang Yang, Dongxiao He, Longbiao Wang, and Weixiong Zhang. "Integrative network embedding via deep joint reconstruction." In Proceedings of the 27th International Joint Conference on Artificial Intelligence, pp. 3407-3413. 2018. (Year: 2018).*

S. Hochreiter et al, "Long Short-term Memory," Neural Computation, vol. 9, No. 8, Nov. 15, 1997, 32 pages.

M. Niepert et al., "Learning Convolutional Neural Networks for Graphs," arXiv:1605.05273v4, Jun. 8, 2016, 10 pages.

Y. Li et al., "Learning Deep Generative Models of Graphs," arXiv:1803.03324v1, Mar. 8, 2018, 21 pages.

J. Bruna et al., "Spectral Networks and Deep Locally Connected Networks on Graphs," arXiv:1312.6203v3, May 21, 2014, 14 pages.

M. Defferrard et al., "Convolutional Neural Networks on Graphs with Fast Localized Spectral Filtering," arXiv:1606.09375v3, Feb. 5, 2017, 9 pages.

B. Yu et al., "Spatio-Temporal Graph Convolutional Networks: A Deep Learning Framework for Traffic Forecasting," arXiv:1709.04875v4, Jul. 12, 2018, 7 pages.

L. Zhao et al., "T-GCN: A Temporal Graph Convolutional Network for Traffic Prediction," arXiv:1811.05320v3, Dec. 31, 2018, 11 pages.

H. L. Nguyen et al., "Knowledge Graph Fusion for Smart Systems: A Survey," Information Fusion, vol. 61, Mar. 31, 2020, pp. 56-70.

* cited by examiner

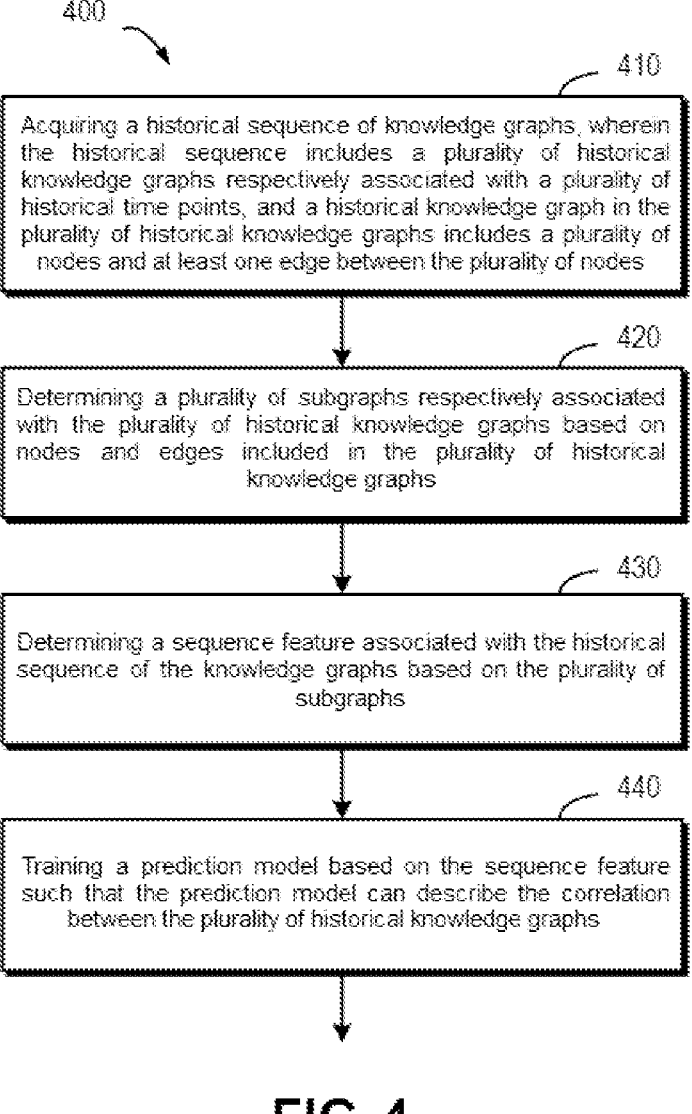

400

410

Acquiring a historical sequence of knowledge graphs, wherein the historical sequence includes a plurality of historical knowledge graphs respectively associated with a plurality of historical time points, and a historical knowledge graph in the plurality of historical knowledge graphs includes a plurality of nodes and at least one edge between the plurality of nodes

420

Determining a plurality of subgraphs respectively associated with the plurality of historical knowledge graphs based on nodes and edges included in the plurality of historical knowledge graphs

430

Determining a sequence feature associated with the historical sequence of the knowledge graphs based on the plurality of subgraphs

440

Training a prediction model based on the sequence feature such that the prediction model can describe the correlation between the plurality of historical knowledge graphs

FIG. 4

METHOD, DEVICE, AND PROGRAM PRODUCT FOR MANAGING KNOWLEDGE GRAPHS

RELATED APPLICATION(S)

The present application claims priority to Chinese Patent Application No. 202111597072.5, filed Dec. 24, 2021, and entitled "Method, Device, and Program Product for Managing Knowledge Graphs," which is incorporated by reference herein in its entirety.

BACKGROUND

With the development of computer technologies, many types of massive data have emerged at present. At this time, how to obtain and fuse information extracted from massive data in an efficient manner has become an important area of research. At present, knowledge graph technology has been proposed, which can display a series of data in a development process relating to various things, so as to describe the correlation among various factors involved in various stages of the development process with visualization technology. At this time, how to manage knowledge graphs and predict the future change trend of the knowledge graphs has also become an important area of research.

SUMMARY

Therefore, it is desirable to develop and implement a technical solution of managing knowledge graphs in a more effective way.

According to a first aspect of the present disclosure, a method for managing knowledge graphs is provided. In this method, a historical sequence of knowledge graphs is obtained, wherein the historical sequence includes a plurality of historical knowledge graphs respectively associated with a plurality of historical time points, and a historical knowledge graph in the plurality of historical knowledge graphs includes a plurality of nodes and at least one edge between the plurality of nodes. Based on nodes and edges included in the plurality of historical knowledge graphs, a plurality of subgraphs respectively associated with the plurality of historical knowledge graphs are determined. A sequence feature associated with the historical sequence of the knowledge graphs is determined based on the plurality of subgraphs. A prediction model is trained based on the sequence feature such that the prediction model can describe the correlation among the plurality of historical knowledge graphs.

According to a second aspect of the present disclosure, an electronic device is provided, including: at least one processor; and a memory coupled to the at least one processor, wherein the memory has instructions stored therein which, when executed by the at least one processor, cause the device to perform actions, and the actions are used to implement the method according to the first aspect of the present disclosure.

According to a third aspect of the present disclosure, a computer program product is provided. The computer program product is tangibly stored on a non-transitory computer-readable medium and includes machine-executable instructions for implementing the method according to the first aspect of the present disclosure.

BRIEF DESCRIPTION OF THE DRAWINGS

In combination with the accompanying drawings and with reference to the following detailed description, the features, advantages, and other aspects of implementations of the present disclosure will become more apparent, and several implementations of the present disclosure are illustrated herein by way of examples rather than limitations. In the accompanying drawings:

FIG. 4 schematically illustrates a flow chart of a method for managing knowledge graphs according to an example implementation of the present disclosure;

DETAILED DESCRIPTION

Example implementations of the present disclosure will be described in more detail below with reference to the accompanying drawings. Although example implementations of the present disclosure are illustrated in the accompanying drawings, it should be understood that the present disclosure may be implemented in various forms and should not be limited by the implementations illustrated herein. Instead, these implementations are provided in order to make the present disclosure more thorough and complete, and to fully convey the scope of the present disclosure to those skilled in the art.

The term "include" used herein and variants thereof indicate open-ended inclusion, that is, "including but not limited to." Unless otherwise stated, the term "or" means "and/or." The term "based on" denotes "at least partially based on." The terms "one example implementation" and "one implementation" mean "at least one example implementation." The term "another implementation" means "at least one additional implementation." The terms "first," "second," and the like may refer to different or the same objects. Other explicit and implicit definitions may also be included below.

For ease of description, an application environment of knowledge graphs will be first described with reference to FIG. 1. Knowledge graphs have been widely used in many environments. For example, in a document management environment, documents with different technical topics published at different time points can be managed based on knowledge graphs. Specifically, changes in technical topics can be determined based on knowledge graphs associated with different time points to predict future development trends. For example, in a user management environment of a social network, user information at different time points can be recorded based on knowledge graphs, then users can be managed based on the knowledge graphs, and so on. For the convenience of description, in the following, more details about knowledge graph management will be described in an environment of document management by only taking document management as an example.

Figure 1:
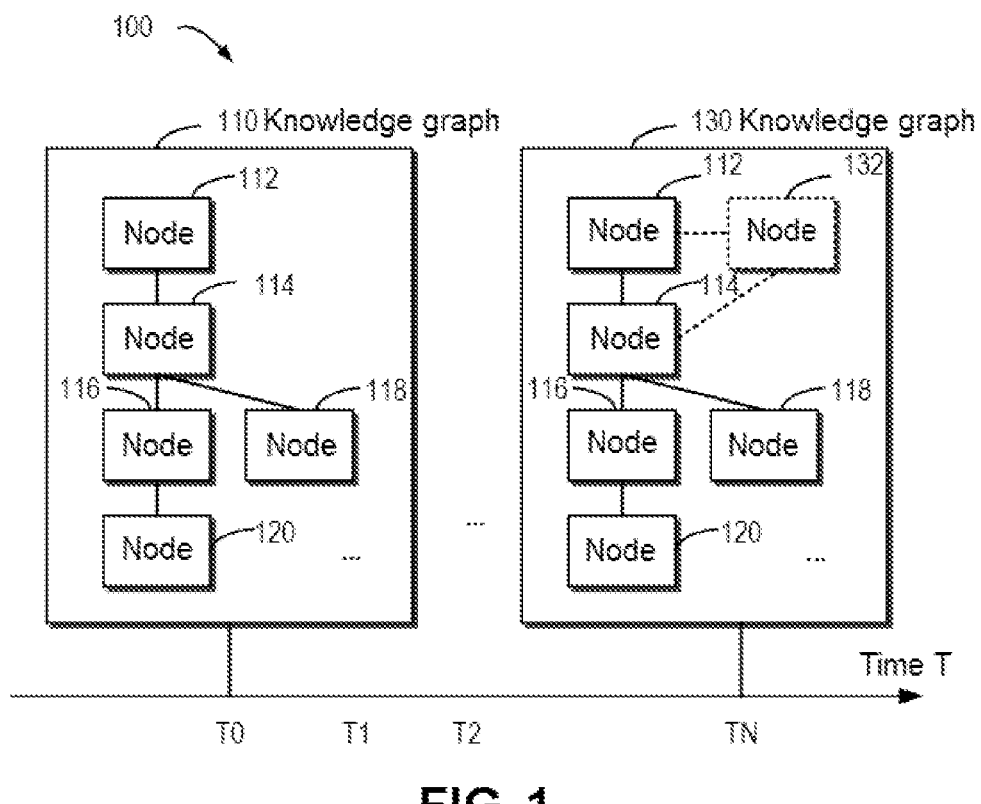
FIG. 1 schematically illustrates a block diagram of an application environment in which knowledge graphs of an example implementation of the present disclosure may be implemented.

FIG. 1 schematically illustrates a block diagram of application environment 100 in which knowledge graphs of an example implementation of the present disclosure may be implemented. As shown in FIG. 1, knowledge graphs associated with a plurality of time points (T0, T1, T2, . . . , TN) in a time axis can be acquired. For example, knowledge graph 110 may be associated with a plurality of technical documents published at time point T0. At this point, knowledge graph 110 may include a plurality of nodes 112, 114, 116, 118, . . . , and 120. Here, each node may represent one technical document, and an edge between two nodes may represent that the documents corresponding to the nodes have a correlation (e.g., involving the same technical topic, etc.). Knowledge graph 130 at time point TN may include a plurality of nodes 112, 114, 116, 118, 120, . . . and 132. At this point, node 132 may represent a newly published technical document, and node 132 may have a correlation with nodes 112 and 114, respectively.

Figure 2:
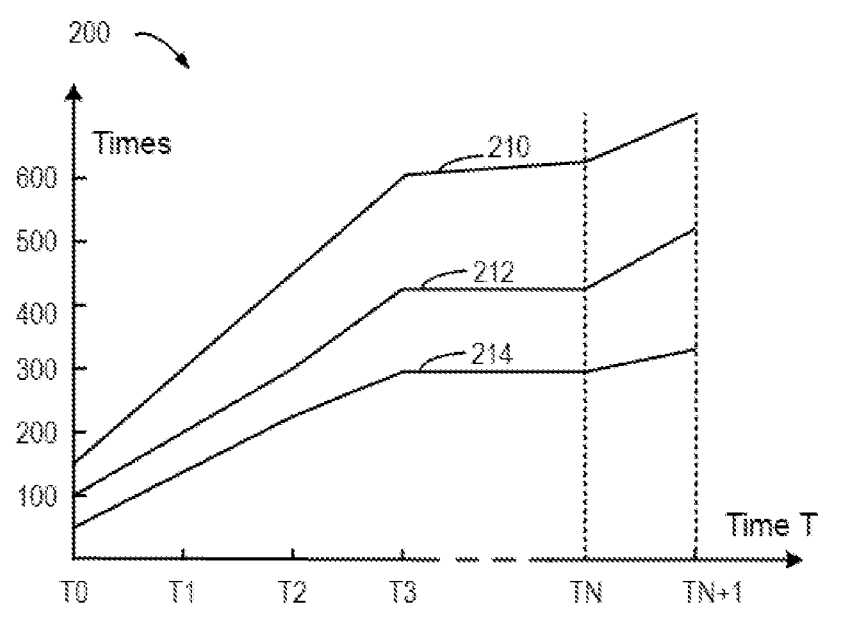
FIG. 2 schematically illustrates plotted curves of the prediction of knowledge graphs involving a plurality of technical topics according to an example implementation of the present disclosure.

The knowledge graphs associated with the time points can be acquired respectively to analyze the relationship between various technical topics. Further, the future development trend of each technology can be predicted based on the determined relationship. FIG. 2 schematically illustrates plotted curves 200 of the prediction of knowledge graphs involving a plurality of technical topics according to an example implementation of the present disclosure. As shown in FIG. 2, the horizontal axis represents a time axis, and the vertical axis represents the number of times each technical topic appears in one technical document. For example, curve 210 may represent the number of times the term "neural network" appears in the technical document, curve 212 represents the number of times the term "network architecture" appears in the technical document, and curve 214 represents the number of times the term "deep learning" appears in the technical document. Because the above three terms are closely related, the change trend of the occurrence times of the three terms is consistent.

At present, technical solutions for establishing a predictive model for knowledge graphs have been proposed. For example, a predictive model can be established based on knowledge graphs collected at different time points. Further, the number of occurrences of each technical topic at a future time point (e.g., TN+1) can be predicted based on the model. However, since the knowledge graphs involve a large amount of data collected at a plurality of historical time points, existing technical solutions cannot effectively manage the knowledge graphs. On the other hand, the accuracy of prediction models related to knowledge graphs is also unsatisfactory. Thus, it is desirable to improve the efficiency of knowledge graph management and the accuracy of prediction.

Figure 3:
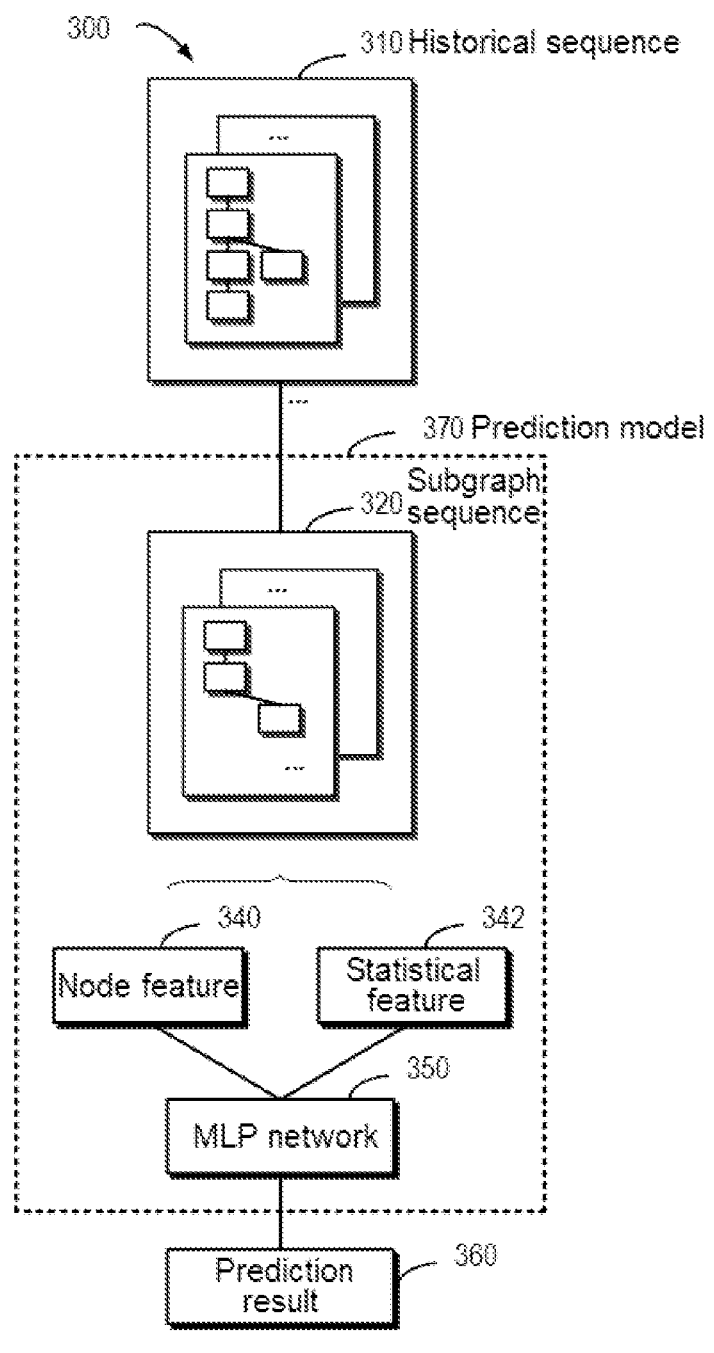
FIG. 3 schematically illustrates a block diagram of a process for managing knowledge graphs according to an example implementation of the present disclosure.

Hereinafter, more details of an example implementation according to the present disclosure will be described with reference to FIG. 3. FIG. 3 schematically illustrates block diagram 300 of a process for managing knowledge graphs according to an example implementation of the present disclosure. As shown in FIG. 3, historical sequence 310 including a plurality of knowledge graphs can be obtained, prediction model 370 can be trained by using historical sequence 310, and then the trained prediction model can be used to generate prediction result 360 for a future time point. It will be understood that, as time goes by, knowledge graphs may include more and more nodes and edges, and at the same time, the number of knowledge graphs will also increase significantly. This leads to an increased amount of data in the knowledge graphs, which in turn requires more storage and computing resources. Further, generating and using prediction model 370 will also consume a lot of storage and computing resources.

According to an example implementation of the present disclosure, subgraph sequence 320 may be extracted from historical sequence 310. Here, historical sequence 310 may include a plurality of historical knowledge graphs, and subgraph sequence 320 may include a plurality of subgraphs respectively extracted from the plurality of historical knowledge graphs. With an example implementation of the present disclosure, features can be extracted based on a portion of the knowledge graphs (i.e., subgraphs) and used for subsequent training and inference processes. As shown in FIG. 3, node feature 340 and statistical feature 342 may be extracted from subgraph sequence 320. Then, both node feature 340 and statistical feature 342 can be input into MLP (multilayer perceptron) network 350, and prediction result 360 can be obtained.

In the training stage, prediction model 370 may be trained using truth-value data in the training dataset. In the inference stage, a sequence of knowledge graphs before the current time point can be taken as historical sequence 310 shown in FIG. 3, and prediction result 360 output by prediction model 370 at this point represents a prediction for a future time point. The process of the training stage is first described below with reference to FIG. 4.

FIG. 4 schematically illustrates flow chart of a method 400 for managing knowledge graphs according to an example implementation of the present disclosure. As shown in FIG. 4, historical sequence 310 of knowledge graphs may be acquired at block 410, wherein historical sequence 310 includes a plurality of historical knowledge graphs respectively associated with a plurality of historical time points, and the historical knowledge graph in the plurality of historical knowledge graphs includes a plurality of nodes and at least one edge between the plurality of nodes. Here, each node may include information of one technical document, and each edge may represent a correlation between two technical documents corresponding to two nodes on both sides of the edge. For example, if two technical documents have the same technical topic, there may be an edge between the nodes corresponding to the two technical documents. In other application environments, nodes and edges may represent other meanings. For example, in a social network, a node may represent a user in the social network, an edge may be a friend relationship between two users, and so on.

Figure 5:
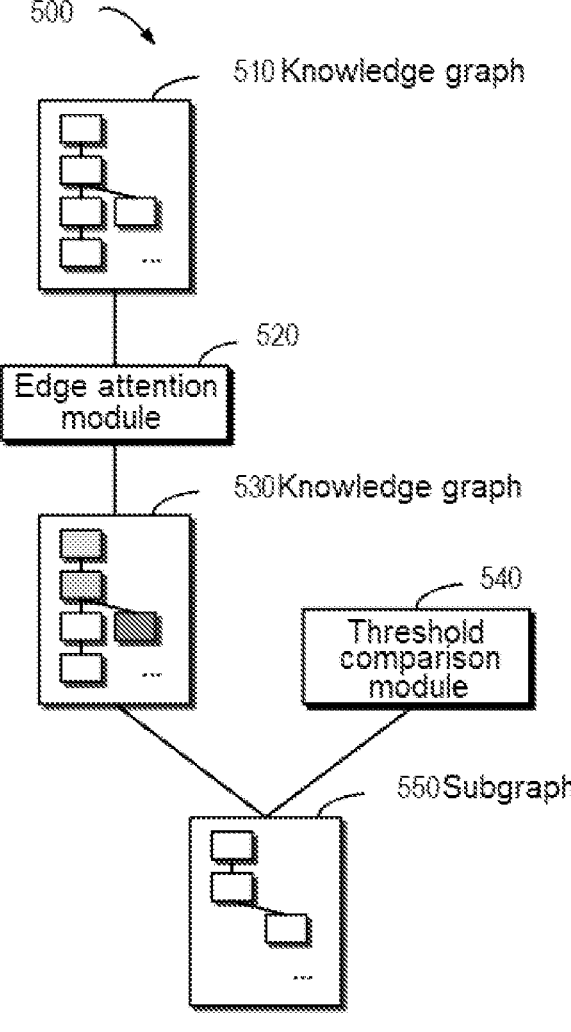
FIG. 5 schematically illustrates a block diagram of a process for determining a subgraph according to an example implementation of the present disclosure.

At block 420, based on nodes and edges included in the plurality of historical knowledge graphs, a plurality of subgraphs respectively associated with the plurality of historical knowledge graphs can be determined. The knowledge graphs can be processed one by one, and one subgraph can be obtained from each historical knowledge graph. Hereinafter, the specific process of extracting subgraphs from knowledge graphs will be described with reference to FIG. 5. FIG. 5 schematically illustrates block diagram 500 of a process for determining a subgraph according to an example implementation of the present disclosure. As shown in FIG. 5, edge attention module 520 can be utilized to set a score for each edge in knowledge graph 510. Further, for each of the knowledge graphs, a subgraph associated with the knowledge graph can be determined based on the scores of the edges.

According to an example implementation of the present disclosure, subgraphs may be determined based on changes in the knowledge graphs. Specifically, edge attention module 520 may set an initial score for each node and edge in knowledge graph 510. Further, changed nodes between the knowledge graph and a knowledge graph previous to the knowledge graph may be determined within a predetermined adjacent range. Assuming that the current knowledge graph is a knowledge graph at time point $T_i$, then the previous knowledge graph may be a knowledge graph at time point $T_{i-1}$.

According to an example implementation of the present disclosure, the attention score of edge $E_k$ between node $V_i$ and $V_j$ in the knowledge graph can be determined based on the following equation:

$$s_{i,j,k} = LeakyReLU(v_a \tanh(W_h v_i \| W_t v_j \| W_r e_k)) \qquad \text{Equation 1}$$

where $W_h$, $W_t$, and $W_r$ respectively represent weights obtained by training based on historical data, and $v_i$, $v_j$, and $e_k$ respectively represent embeddings of the corresponding nodes $V_i$ and $V_j$ and edge $E_k$. In other words, the attention score for given edge $E_k$ can be determined based on Equation 1 and using the given edge and nodes $V_i$ and $V_j$ on both sides of the edge. The function LeakyReLU denotes a leaky rectified linear unit.

According to an example implementation of the present disclosure, attention matrix A can be determined based on Equation 1 described above:

$$A = softmax(S) \qquad \text{Equation 2}$$

where A represents an n×n attention matrix of the knowledge graph (n being the number of nodes in the knowledge graph), softmax represents the softmax function, and S represents the attention score determined based on Equation 1 above.

Further, an edge score can be updated based on a change between two temporally adjacent knowledge graphs. Generally speaking, it can be considered that the range of influence of a change is limited, and the strength of the influence diminishes with the distance between nodes (i.e., the number of "hops"). Assuming that a document is added to the subsequent knowledge graph, which has the same technical topic as the document represented by another node. At this point, an edge can be added between this node and another node. More edges can be added if the node has the same technical topic as the documents represented by multiple nodes. According to an example implementation of the present disclosure, attenuation factor θ may be set based on distance within a predetermined adjacent range.

According to an example implementation of the present disclosure, if node $V_i$ has changed, initial activity score $a_{0,i}$ of the node may be set to 1. Assuming that the predetermined adjacent range is 3 "hops," then attenuation factor θ=0.5 (or another value) can be set. According to an example implementation of the present disclosure, a plurality of adjacent edges within a predetermined adjacent range may be determined. Further, the scores of the nodes within a predetermined adjacent range may be determined based on the attenuation factor. According to an example implementation of the present disclosure, propagation factor $P_{i,j}$ between nodes $V_i$ and $V_j$ can be expressed as:

$$P_{i,j} = \theta_k \cdot a_{i,j} \qquad \text{Equation 3}$$

where $P_{i,j}$ denotes the propagation factor between nodes $V_i$ and $V_j$, $\theta_k$ denotes the attenuation coefficient for edge $E_k$, and $a_{i,j}$ denotes the activity score. The final activity score can be expressed as the sum of all propagation scores:

$$a_j = a_{j,0} + \sum_{i=0}^{\infty} a_{i,j} \qquad \text{Equation 4}$$

For two knowledge graphs that are consecutive in time, the changed nodes can be determined first. The score for each node is then determined based on the equation described above within a predetermined adjacent range of each of the changed nodes. As shown in FIG. 5, each node in knowledge graph 530 may have an individual score (e.g., represented in a different grayscale). Further, threshold comparison module 540 may set a predetermined threshold (e.g., 0.2 or another value) and perform filtering operations. When the score of a node is higher than the threshold, the node is retained in the subgraph; otherwise, the node is not retained in the subgraph. In other words, nodes with scores not higher than the threshold may be removed from the knowledge graph to form subgraph 550. With an example implementation of the present disclosure, repetitive parts can be removed from the knowledge graphs, thereby greatly reducing the amount of data to be processed. On the other hand, subgraphs can retain parts related to changes, which makes it possible to retain effective parts related to the prediction based on the subgraphs, thereby improving the accuracy of prediction model 370.

According to an example implementation of the present disclosure, all knowledge graphs in historical sequence 310 may be processed to respectively obtain a subgraph of each knowledge graph. At this point, subgraph sequence 320 may include a plurality of subgraphs from the plurality of knowledge graphs.

Returning to FIG. 4 to describe subsequent processing, at block 430, a sequence feature associated with the historical sequence of the knowledge graphs is determined based on the plurality of subgraphs. With an example implementation of the present disclosure, features can be extracted from a subgraph sequence that includes a small amount of data, instead of extracting features from the original knowledge graph sequence that includes a lot of repetitive data. In this way, on the one hand, the resource overhead related to data processing can be reduced, and on the other hand, features can be extracted based on the changes of the knowledge graphs, making the prediction model pay more attention to the changes of the knowledge graphs, which in turn helps to improve the accuracy of the prediction model.

Figure 6:
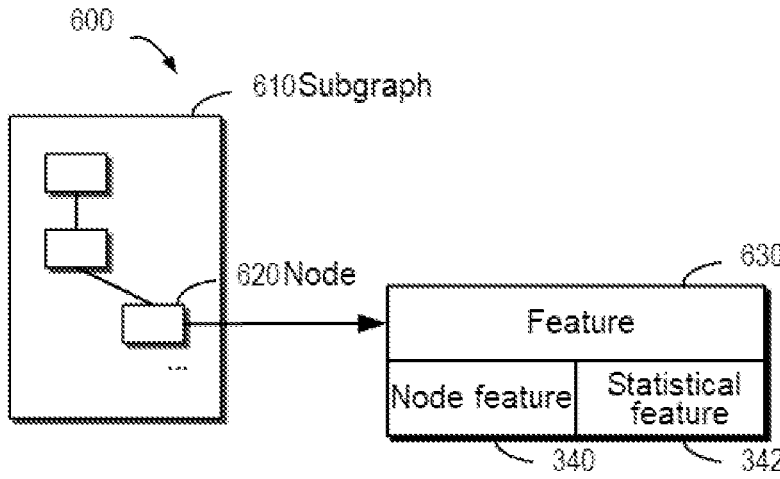
FIG. 6 schematically illustrates a block diagram of a process for determining a subgraph feature based on features of nodes according to an example implementation of the present disclosure.

According to an example implementation of the present disclosure, features may be extracted for each subgraph. Here, corresponding features can be extracted respectively based on node content and statistical information in a subgraph. Each subgraph may be processed in a similar manner, and more details of features that form one subgraph will be described below with reference to FIG. 6. FIG. 6 schematically illustrates block diagram 600 of a process for determining a subgraph feature based on features of nodes according to an example implementation of the present disclosure. As shown in FIG. 6, for node 620 in subgraph 610, node feature 340 associated with node 620 may be determined based on the content of node 620. It will be appreciated that node feature 340 may be extracted based on a variety of encoders currently known and/or to be developed in the future. According to an example implementation of the present disclosure, node feature 340 output by different types of encoders may have different dimensions. For example, the dimension of node feature 340 may be 512 or other values.

Further, statistical feature 342 of node 620 may be determined based on statistical information associated with node 620. It will be understood that the statistical information here may refer to a statistical result for node content. For example, in the example of the technical document above, the statistical information may include, but is not limited to, the frequency of occurrence of a technical topic, the frequency of occurrence of a certain term, and the like. In an example of a social network, the statistical information may include, for example, the number of friends of the user, and the like. It will be understood that statistical information is often represented with low-dimensional (e.g., 1-dimensional) data, and if low-dimensional (e.g., 1-dimensional) statistical information is directly connected with high-dimensional (e.g., 512-dimensional) node feature 340, the statistical information will be submerged in high-dimensional node feature 340.

According to an example implementation of the present disclosure, a technical solution for expanding the dimension of statistical information to generate statistical feature 342 is provided. The number of dimensions of statistical feature 342 may be determined based on the number of dimensions of node feature 340. For example, statistical feature 342 and node feature 340 may have the same number of dimensions. Alternatively and/or additionally, the number of dimensions of statistical feature 342 may be smaller than the number of dimensions of node feature 340. For example, the ratio of the two may be set to 1:2 or other ratios.

Further, the value corresponding to the dimension in the statistical feature may be determined based on the statistical information and a trigonometric function corresponding to the dimension. According to an example implementation of the present disclosure, assuming that the number of dimensions of statistical feature 342 is d, then the value of each component in the statistical feature can be determined based on the following equation.

$$\vec{p_t} = \begin{bmatrix} \sin(\omega_1 \cdot t) \\ \cos(\omega_1 \cdot t) \\ \sin(\omega_2 \cdot t) \\ \cos(\omega_2 \cdot t) \\ \cdots \\ \sin(\omega_{d/2} \cdot t) \\ \cos(\omega_{d/2} \cdot t) \end{bmatrix}_{d \times 1} \qquad \text{Equation 5}$$

where $\vec{p_t}$ represents the statistical feature, t represents the statistical information, and $\omega$ may represent angle information corresponding to the position of each dimension in the statistical feature. A specific calculation equation of $\omega_i$ can be defined. For example, a value of $\omega_i$ can be determined on an incremental basis. For another example, the value of $\omega_i$ may be determined based on multiple or other methods. At this point, the statistical feature is represented by a d×1 dimensional vector, the value at the first position in the vector can be expressed as $\sin(\omega_1 \cdot t)$, the value at the second position can be expressed as $\cos(\omega_1 \cdot t)$, and so on. According to an example implementation of the present disclosure, the value at position k in the statistical feature can be determined based on the following Equation 6:

$$D_k = \begin{cases} \sin(\omega_n \cdot t), \text{ if } k = 2n \\ \cos(\omega_n \cdot t), \text{ if } k = 2n + 1 \end{cases}, \text{ where } \omega_n = \frac{1}{10000^{2n/d}} \qquad \text{Equation 6}$$

where $D_k$ represents the value at position k in the statistical feature, n represents a positive integer, and $\omega_n$ represents an angle associated with the position.

It will be understood that equations 5 and 6 above only show examples for determining a statistical feature, and the values of various positions in the statistical feature may also be determined based on other equations. For example, the specific value at each position may be determined based on a sine function, a cosine function, a tangent function, a cotangent function, and/or combinations thereof. With an example implementation of the present disclosure, low-dimensional statistical information can be transformed into a statistical feature that matches high-dimensional node dimensions. At this point, the numbers of dimensions of statistical feature 342 and node feature 340 are similar, so the influence of the statistical information can be maintained in subsequent training and inference processes.

According to an example implementation of the present disclosure, node feature 340 and statistical feature 342 may be connected to generate feature 630 associated with the node. Assuming that the numbers of dimensions of node feature 340 and statistical feature 342 are both 512, then the dimension of feature 630 may be 512+512=1024. With an example implementation of the present disclosure, in feature 630 of node 620, features related to content of the node and statistical information of the node are stored, which can help to train a prediction model with the information of the above two aspects and further improve the accuracy of describing the knowledge graph.

According to an example implementation of the present disclosure, each node in subgraph 610 may be similarly processed in the manner described above in order to obtain the features of each node. Further, subgraph features of subgraph 610 may be determined based on the features of each node in subgraph 610. For example, the features of various nodes can be connected to obtain subgraph features of subgraph 610. Alternatively and/or additionally, the subgraph features of subgraph 610 may be mapped to, for example, 512 dimensions or other dimensions.

Figure 7:
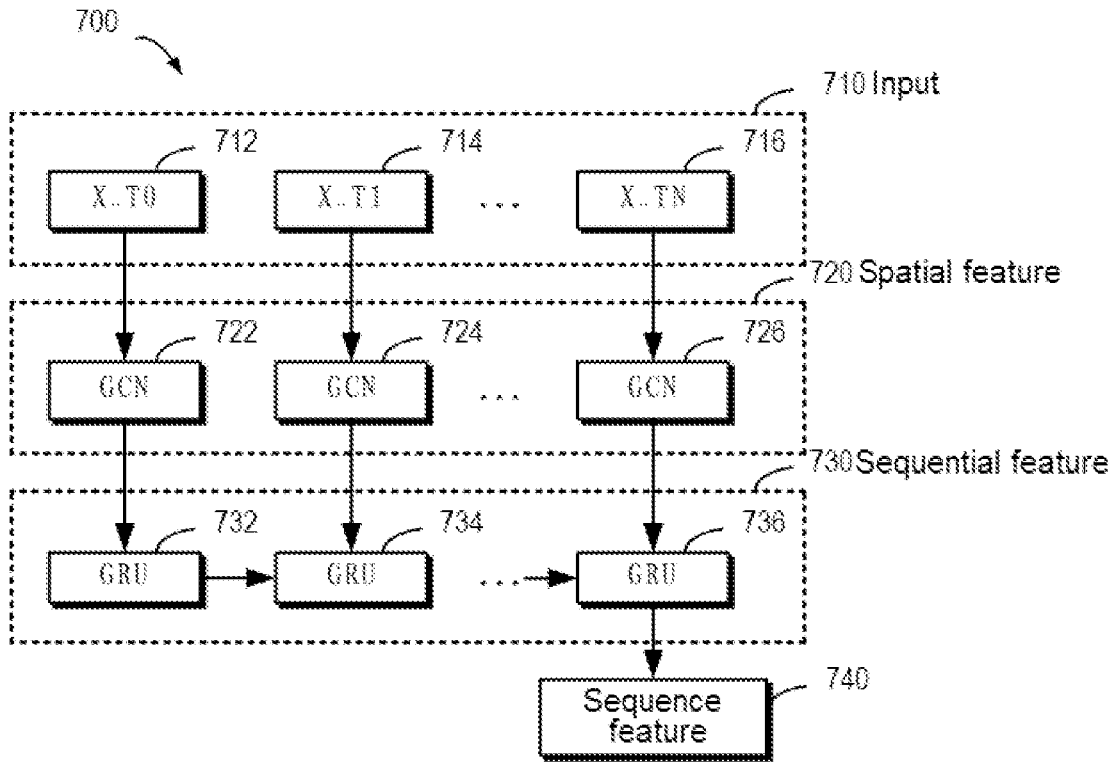
FIG. 7 schematically illustrates a block diagram of a process for determining a sequence feature according to an example implementation of the present disclosure.

According to an example implementation of the present disclosure, a TGNN (Temporal Graph Neural Network) can be used to determine the sequence feature of the entire knowledge graph sequence. Hereinafter, more details about TGNN will be described with reference to FIG. 7. FIG. 7 schematically illustrates block diagram 700 of a process for determining a sequence feature according to an example implementation of the present disclosure. As shown in FIG. 7, input 710 may include receiving an input from each knowledge graph in a sequence of knowledge graphs. For example, input X_T0 712 may represent a subgraph feature of a subgraph of the knowledge graph at time point T0, input X_T1 714 may represent a subgraph feature of a subgraph of the knowledge graph at time point T1, . . . , and input X_TN 716 may represent a subgraph feature of a subgraph of the knowledge graph corresponding to time point TN.

Then, spatial feature 720 of the knowledge graph sequence can be further extracted based on a GCN (Graph Convolutional Network). For example, GCN 722 may be used to process the subgraph features from time point T0, GCN 724 may be used to process the subgraph features from time point T1, . . . , and GCN 726 may be used to process the subgraph features from time point TN. Further, temporal (e.g., sequential) feature 730 of the knowledge graph sequence can be extracted based on a GRU (Gated Recurrent Network). For example, GRU 732 may be used to process the spatial features from time point T0, GRU 734 may be used to process the spatial features from time point T1, . . . , and GRU 736 may be used to process the spatial features from time point TN. In this way, sequence feature 740 of the entire knowledge graph sequence can be output.

With an example implementation of the present disclosure, in the process of determining sequence feature 740, by extracting subgraphs based on changed nodes in successive knowledge graphs in the knowledge graph sequence, the amount of data to be processed can be reduced, and the subsequent features can be made to pay more attention to changes in the knowledge graphs. On the other hand, by extending statistical information of nodes to the number of dimensions that matches features of the nodes, the statistical information can be preserved as much as possible for subsequent processing. In this way, it is possible to improve the accuracy of the sequence feature while reducing data processing resource requirements, thereby facilitating the improvement of the accuracy of the prediction model.

Returning to FIG. 4, at block 440, a prediction model may be trained based on the sequence feature such that the prediction model can describe the correlation among the plurality of historical knowledge graphs. According to an example implementation of the present disclosure, each piece of training data may be processed based on the method described above. In this way, a corresponding sequence feature can be obtained from each piece of training data. Further, prediction model 370 may be trained based on a variety of ways that are currently known and/or to be developed in the future. For example, the sequence of knowledge graphs other than the last knowledge graph in the historical sequence of the knowledge graphs may be processed based on the method described above to obtain sequence features. A prediction of the knowledge graphs can be obtained based on the sequence features and the initial prediction model, and then the prediction model may be compared with a true value of the knowledge graph at the end of the historical sequence of the knowledge graphs in order to determine a loss for training the prediction model.

According to an example implementation of the present disclosure, the training process may be performed iteratively with a plurality of pieces of training data until the loss reaches a predetermined threshold condition. It will be understood that since sequence features are obtained based on subgraphs and include statistical information of which the dimensions have been extended, performing training using sequence features obtained according to an example implementation of the present disclosure can reduce the data flow while retaining more training information, thereby achieving higher efficiency.

Figure 8:
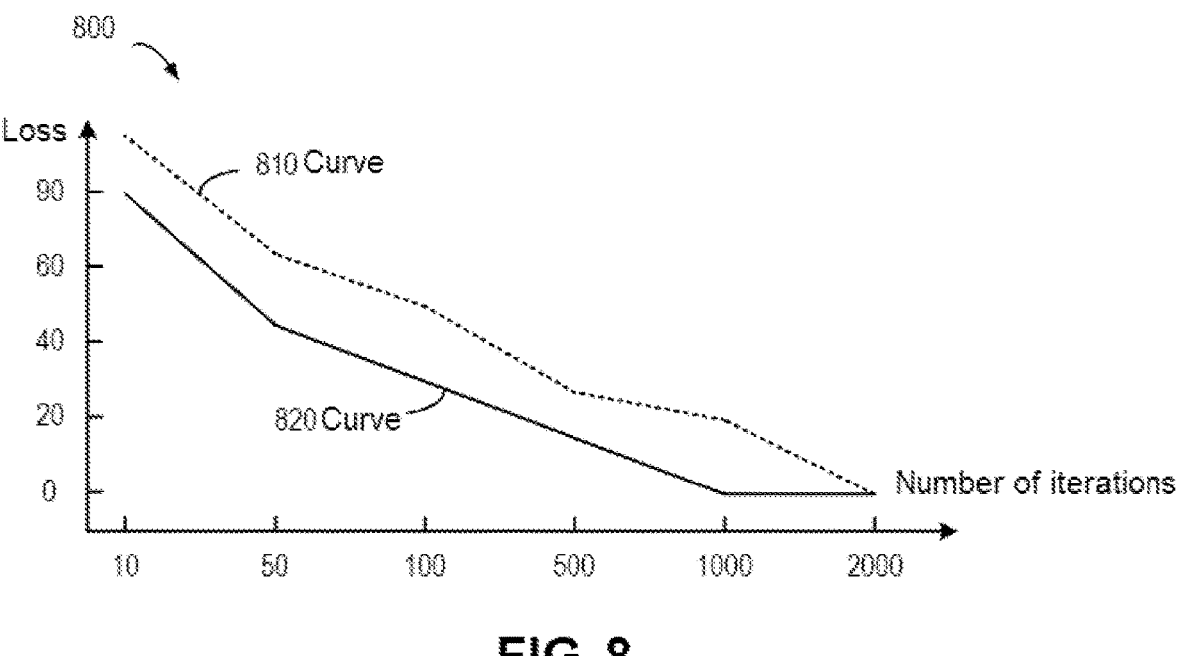
FIG. 8 schematically illustrates plotted curves of a comparison between a loss curve according to an example implementation of the present disclosure and a loss curve determined in a conventional manner.

FIG. 8 schematically illustrates plotted curves 800 of a comparison between a loss curve according to an example implementation of the present disclosure and a loss curve determined in a conventional manner. As shown in FIG. 8, the horizontal axis indicates the number of iterations during training and the vertical axis indicates the loss. Curve 810 represents the loss of training using sequence features extracted by existing technical solutions, and curve 820 represents the loss of training using the sequence features extracted by the solution of the present disclosure. It can be seen from FIG. 8 that the loss corresponding to curve 820 converges faster, and the predetermined loss threshold can be reached at about the 1000th iteration. However, curve 810 does not reach the predetermined loss threshold until about the 2000th iteration. It can be seen that the sequence features extracted by the disclosed method can accelerate the convergence speed and then obtain higher training efficiency.

The details of the training process have been described above, and in the following, the trained prediction model can be used to process the knowledge graph sequence in the past time period in order to predict the knowledge graphs at a future time point. Specifically, an input sequence of knowledge graphs can be obtained, which includes a plurality of knowledge graphs respectively associated with a plurality of time points before the current time point. The method of extracting sequence features described above can be performed for each of the plurality of knowledge graphs.

Specifically, each knowledge graph can be processed separately, and the subgraph of each knowledge graph can be obtained. A node feature and a statistical feature can be extracted for each node in the subgraph, and the two features can be connected to determine features of each node. Further, subgraph features of subgraphs can be generated based on the features of each node, and the generated subgraph features can be input to TGNN as shown in FIG. 7 to determine the final sequence features. The sequence features can be input into trained prediction model 370 in order to obtain the prediction at a future time point. With an example implementation of the present disclosure, since prediction model 370 has higher accuracy, the prediction result obtained based on prediction model 370 can have higher accuracy.

Examples of the method according to the present disclosure have been described in detail above with reference to FIGS. 2 to 8, and an implementation of a corresponding apparatus will be described below. According to an example implementation of the present disclosure, an apparatus for managing knowledge graphs is provided. The apparatus includes: an acquiring module configured to acquire a historical sequence of knowledge graphs, wherein the historical sequence includes a plurality of historical knowledge graphs respectively associated with a plurality of historical time points, and the historical knowledge graphs in the plurality of historical knowledge graphs include a plurality of nodes and at least one edge between the plurality of nodes; a subgraph determining module configured to determine a plurality of subgraphs respectively associated with the plurality of historical knowledge graphs based on nodes and edges included in the plurality of historical knowledge graphs; a feature determining module configured to determine a sequence feature associated with the historical sequence of the knowledge graphs based on the plurality of subgraphs; and a training module configured to train a prediction model based on the sequence feature such that the prediction model can describe the correlation among the plurality of historical knowledge graphs. According to an example implementation of the present disclosure, the apparatus may also include modules configured to perform other steps in method 400 described above.

Figure 9:
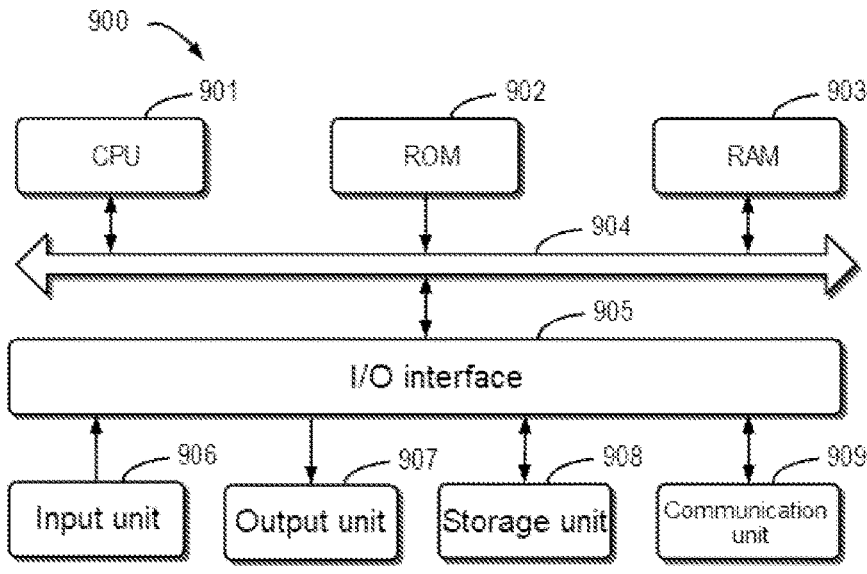
FIG. 9 schematically illustrates a block diagram of a device for managing knowledge graphs according to an example implementation of the present disclosure.

FIG. 9 schematically shows a block diagram of device 900 for managing knowledge graphs according to an example implementation of the present disclosure. As shown in the figure, device 900 includes central processing unit (CPU) 901 that may perform various appropriate actions and processing according to computer program instructions stored in read-only memory (ROM) 902 or computer program instructions loaded from storage unit 908 to random access memory (RAM) 903. Various programs and data required for the operation of device 900 may also be stored in RAM 903. CPU 901, ROM 902, and RAM 903 are connected to each other through bus 904. Input/output (I/O) interface 905 is also connected to bus 904.

A plurality of components in device 900 are connected to I/O interface 905, including: input unit 906, such as a keyboard and a mouse; output unit 907, such as various types of displays and speakers; storage unit 908, such as a magnetic disk and an optical disc; and communication unit 909, such as a network card, a modem, and a wireless communication transceiver. Communication unit 909 allows device 900 to exchange information/data with other devices via a computer network, such as the Internet, and/or various telecommunication networks.

The various processes and processing described above, such as method 400, may be executed by CPU 901. For example, in some implementations, method 400 may be implemented as a computer software program that is tangibly included in a machine-readable medium, such as storage unit 908. In some implementations, part of or all the computer program may be loaded and/or installed onto device 900 via ROM 902 and/or communication unit 909. One or more steps of method 400 described above may be performed when the computer program is loaded into RAM 903 and executed by CPU 901. Alternatively, in other implementations, CPU 901 may also be configured in any other suitable manner to implement the above processes/methods.

According to an example implementation of the present disclosure, an electronic device is provided, including: at least one processor; and a memory coupled to the at least one processor, wherein the memory has instructions stored therein which, when executed by the at least one processor, cause the device to perform actions. The actions include: acquiring a historical sequence of knowledge graphs, wherein the historical sequence includes a plurality of historical knowledge graphs respectively associated with a plurality of historical time points, and the historical knowledge graphs in the plurality of historical knowledge graphs include a plurality of nodes and at least one edge between the plurality of nodes; determining a plurality of subgraphs respectively associated with the plurality of historical knowledge graphs based on nodes and edges included in the plurality of historical knowledge graphs; determining a sequence feature associated with the historical sequence of the knowledge graphs based on the plurality of subgraphs; and training a prediction model based on the sequence feature such that the prediction model can describe the correlation among the plurality of historical knowledge graphs.

According to an example implementation of the present disclosure, determining the plurality of subgraphs includes: In the historical knowledge graph, for a node in the plurality of nodes, a node score of the node is determined based on the node and an edge connected to the node; and a subgraph associated with the historical knowledge graph is determined based on the node score.

According to an example implementation of the present disclosure, determining the node score includes: determining a changed node between the historical knowledge graph and a historical knowledge graph previous to the historical knowledge graph within a predetermined adjacent range of the node; and determining the node score of the node based on the changed node and a path associated with the changed node.

According to an example implementation of the present disclosure, determining the node score of the node based on the changed node and the path includes: determining an edge score of an edge on the path; and determining the node score based on the edge score and a distance between the edge and the node.

According to an example implementation of the present disclosure, determining the subgraph includes: in response to determining that the node score satisfies a threshold condition, removing the node from the historical knowledge graph to determine the subgraph.

According to an example implementation of the present disclosure, determining the sequence feature includes: generating a plurality of subgraph features respectively associated with the plurality of subgraphs; and generating the sequence feature based on the plurality of subgraph features.

According to an example implementation of the present disclosure, generating the plurality of subgraph features includes: For a subgraph in the plurality of subgraphs, determining a plurality of features respectively associated with a plurality of nodes included in the subgraph; and generating a subgraph feature associated with the subgraph based on the plurality of features.

According to an example implementation of the present disclosure, determining the plurality of features includes, for a node in the plurality of nodes, determining a node feature associated with the node based on content of the node; determining a statistical feature associated with the node based on statistical information associated with the node; and connecting the node feature and the statistical feature to generate a feature associated with the node.

According to an example implementation of the present disclosure, determining the statistical feature includes: determining the number of dimensions of the statistical feature based on the number of dimensions of the node feature; and for a dimension in a plurality of dimensions of the statistical feature, determining a value in the statistical feature corresponding to the dimension based on the statistical information and a trigonometric function corresponding to the dimension.

According to an example implementation of the present disclosure, the actions further include: acquiring an input sequence of the knowledge graphs, the input sequence including a plurality of knowledge graphs respectively associated with a plurality of time points before the current time point; and based on the prediction model and the input sequence of the knowledge graphs, determining a prediction of knowledge graphs associated with future time points after the current time point.

According to an example implementation of the present disclosure, a computer program product is provided, the computer program product being tangibly stored on a non-transitory computer-readable medium and including machine-executable instructions, wherein the machine-executable instructions are used to execute the method according to the present disclosure.

According to an example implementation of the present disclosure, a computer-readable medium is provided, the computer-readable medium storing machine-executable instructions which, when executed by at least one processor, cause the at least one processor to implement the method according to the present disclosure.

Illustrative embodiments of the present disclosure include a method, a device, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages, wherein the programming languages include object-oriented programming languages such as Smalltalk and C ++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some implementations, an electronic circuit, for example, a programmable logic circuit, a field programmable gate array (FPGA), or a programmable logic array (PLA), is personalized by utilizing state information of the computer-readable program instructions, wherein the electronic circuit may execute the computer-readable program instructions so as to implement various aspects of the present disclosure.

Various aspects of the present disclosure are described herein with reference to flow charts and/or block diagrams of the method, the apparatus (system), and the computer program product according to implementations of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to a plurality of implementations of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

Various implementations of the present disclosure have been described above. The above description is illustrative and not exhaustive, and is not limited to the various implementations disclosed. Numerous modifications and alterations will be apparent to persons of ordinary skill in the art without departing from the scope and spirit of the illustrated implementations. The selection of terms as used herein is intended to best explain principles and practical applications of various implementations or improvements to technologies on the market, so as to enable persons of ordinary skill in the art to understand the implementations disclosed herein.

What is claimed is:

1. A method, comprising:

acquiring, in a processor-based machine learning system, a historical sequence of knowledge graphs, wherein the historical sequence comprises a plurality of historical knowledge graphs respectively associated with a plurality of historical time points, and a historical knowledge graph in the plurality of historical knowledge graphs includes a plurality of nodes and at least one edge between the plurality of nodes;

applying the historical knowledge graphs to an attention-based activation mechanism of the processor-based machine learning system, the attention-based activation mechanism being configured to determine a plurality of subgraphs respectively associated with the plurality of historical knowledge graphs based on nodes and edges included in the plurality of historical knowledge graphs, wherein attention measures are generated for respective ones of the edges by processing, for each of the edges, weighted edge information for that edge and associated weighted first and second node information for respective first and second nodes connected by that edge, utilizing a rectified linear unit of the attention-based activation mechanism, and further wherein the subgraphs are determined based on the attention measures;

applying the subgraphs to a first neural network of the processor-based machine learning system, the first neural network being configured to determine node embeddings for respective nodes of the subgraphs;

determining, in the processor-based machine learning system, statistical embeddings for the respective nodes of the subgraphs, wherein each of the statistical embeddings is generated by expanding a dimension of statistical information associated with a corresponding one of the nodes through application of a designated function to the statistical information, the designated function generating respective different positional entries of the statistical embedding from the statistical information;

combining, in the processor-based machine learning system, the node embedding with the statistical embedding for the respective nodes of the subgraphs, to generate respective corresponding combined embeddings;

applying the combined embeddings to a second neural network of the processor-based machine learning system, the second neural network comprising a plurality of graph convolutional networks coupled to respective ones of a plurality of gated recurrent units, with the graph convolutional networks and the gated recurrent units being collectively configured to determine a sequence feature associated with the historical sequence of the knowledge graphs based on the plurality of subgraphs, by processing at least a portion of the combined embeddings generated for the respective nodes of the subgraphs; and training a prediction model of the processor-based machine learning system based on the sequence feature such that the prediction model can describe a correlation among the plurality of historical knowledge graphs, wherein the prediction model comprises a multi-layer perceptron.

2. The method according to claim 1, wherein determining the plurality of subgraphs comprises: in the historical knowledge graph, for a node in the plurality of nodes, determining a node score of the node based on the node and edges connected to the node; and determining a subgraph associated with the historical knowledge graph based on the node score.

3. The method according to claim 2, wherein determining the node score comprises:

determining changed nodes between the historical knowledge graph and a historical knowledge graph previous to the historical knowledge graph within a predetermined adjacent range of the node; and determining the node score of the node based on the changed nodes and a path associated with the changed nodes.

4. The method according to claim 3, wherein determining the node score of the node based on the changed nodes and the path comprises:

determining edge scores of edges on the path; and determining the node score based on the edge scores and distances between the edges and the node.

5. The method according to claim 2, wherein determining the subgraph comprises: in response to determining that the node score satisfies a threshold condition, removing the node from the historical knowledge graph to determine the subgraph.

6. The method according to claim 1, wherein determining the sequence feature comprises:

generating a plurality of subgraph features respectively associated with the plurality of subgraphs; and generating the sequence feature based on the plurality of subgraph features.

7. The method according to claim 6, wherein generating the plurality of subgraph features comprises: for a subgraph in the plurality of subgraphs, determining a plurality of features respectively associated with a plurality of nodes included in the subgraph; and generating a subgraph feature associated with the subgraph based on the plurality of features.

8. The method according to claim 7, wherein determining the plurality of features comprises, for a node in the plurality of nodes, determining a node feature associated with the node based on content of the node;

determining a statistical feature associated with the node based on statistical information associated with the node; and connecting the node feature and the statistical feature to generate a feature associated with the node.

9. The method according to claim 8, wherein determining the statistical feature comprises:

determining a number of dimensions of the statistical feature based on the number of dimensions of the node feature; and for a dimension in a plurality of dimensions of the statistical feature, determining a value in the statistical feature corresponding to the dimension based on the statistical information and a trigonometric function corresponding to the dimension.

10. The method according to claim 1, further comprising:

acquiring an input sequence of the knowledge graphs, the input sequence including a plurality of knowledge graphs respectively associated with a plurality of time points before a current time point; and based on the prediction model and the input sequence of the knowledge graphs, determining a prediction of knowledge graphs associated with future time points after the current time point.

11. An electronic device, comprising:

at least one processor; and memory coupled to the at least one processor and having instructions stored therein, wherein the instructions, when executed by the at least one processor, cause the electronic device to perform actions comprising:

acquiring, in a processor-based machine learning system, a historical sequence of knowledge graphs, wherein the historical sequence comprises a plurality of historical knowledge graphs respectively associated with a plurality of historical time points, and a historical knowledge graph in the plurality of historical knowledge graphs includes a plurality of nodes and at least one edge between the plurality of nodes;

applying the historical knowledge graphs to an attention-based activation mechanism of the processor-based machine learning system, the attention-based activation mechanism being configured to determine a plurality of subgraphs respectively associated with the plurality of historical knowledge graphs based on nodes and edges included in the plurality of historical knowledge graphs, wherein attention measures are generated for respective ones of the edges by processing, for each of the edges, weighted edge information for that edge and associated weighted first and second node information for respective first and second nodes connected by that edge, utilizing a rectified linear unit of the attention-based activation mechanism, and further wherein the subgraphs are determined based on the attention measures;

applying the subgraphs to a first neural network of the processor-based machine learning system, the first neural network being configured to determine node embeddings for respective nodes of the subgraphs;

determining, in the processor-based machine learning system, statistical embeddings for the respective nodes of the subgraphs, wherein each of the statistical embeddings is generated by expanding a dimension of statistical information associated with a corresponding one of the nodes through application of a designated function to the statistical information, the designated function generating respective different positional entries of the statistical embedding from the statistical information;

combining, in the processor-based machine learning system, the node embedding with the statistical embedding for the respective nodes of the subgraphs, to generate respective corresponding combined embeddings;

applying the combined embeddings to a second neural network of the processor-based machine learning system, the second neural network comprising a plurality of graph convolutional networks coupled to respective ones of a plurality of gated recurrent units, with the graph convolutional networks and the gated recurrent units being collectively configured to determine a sequence feature associated with the historical sequence of the knowledge graphs based on the plurality of subgraphs, by processing at least a portion of the combined embeddings generated for the respective nodes of the subgraphs; and training a prediction model of the processor-based machine learning system based on the sequence feature such that the prediction model can describe a correlation among the plurality of historical knowledge graphs, wherein the prediction model comprises a multi-layer perceptron.

12. The electronic device according to claim 11, wherein determining the plurality of subgraphs comprises: in the historical knowledge graph, for a node in the plurality of nodes, determining a node score of the node based on the node and edges connected to the node; and determining a subgraph associated with the historical knowledge graph based on the node score.

13. The electronic device according to claim 12, wherein determining the node score comprises:

determining changed nodes between the historical knowledge graph and a historical knowledge graph previous to the historical knowledge graph within a predetermined adjacent range of the node; and determining the node score of the node based on the changed nodes and a path associated with the changed nodes.

14. The electronic device according to claim 13, wherein determining the node score of the node based on the changed nodes and the path comprises:

determining edge scores of edges on the path; and determining the node score based on the edge scores and distances between the edges and the node.

15. The electronic device according to claim 12, wherein determining the subgraph comprises: in response to determining that the node score satisfies a threshold condition, removing the node from the historical knowledge graph to determine the subgraph.

16. The electronic device according to claim 11, wherein determining the sequence feature comprises:

generating a plurality of subgraph features respectively associated with the plurality of subgraphs; and generating the sequence feature based on the plurality of subgraph features.

17. The electronic device according to claim 16, wherein generating the plurality of subgraph features comprises: for a subgraph in the plurality of subgraphs, determining a plurality of features respectively associated with a plurality of nodes included in the subgraph; and generating a subgraph feature associated with the subgraph based on the plurality of features.

18. The electronic device according to claim 17, wherein determining the plurality of features comprises, for a node in the plurality of nodes, determining a node feature associated with the node based on content of the node;

determining a statistical feature associated with the node based on statistical information associated with the node; and connecting the node feature and the statistical feature to generate a feature associated with the node.

19. The electronic device according to claim 18, wherein determining the statistical feature comprises:

determining a number of dimensions of the statistical feature based on the number of dimensions of the node feature; and for a dimension in a plurality of dimensions of the statistical feature, determining a value in the statistical feature corresponding to the dimension based on the statistical information and a trigonometric function corresponding to the dimension.

20. A computer program product that is tangibly stored on a non-transitory computer-readable medium and comprises machine-executable instructions, wherein the machine-executable instructions, when executed by a machine, cause the machine to perform actions comprising:

acquiring, in a processor-based machine learning system, a historical sequence of knowledge graphs, wherein the historical sequence comprises a plurality of historical knowledge graphs respectively associated with a plurality of historical time points, and a historical knowledge graph in the plurality of historical knowledge graphs includes a plurality of nodes and at least one edge between the plurality of nodes;

applying the historical knowledge graphs to an attention-based activation mechanism of the processor-based machine learning system, the attention-based activation mechanism being configured to determine a plurality of subgraphs respectively associated with the plurality of historical knowledge graphs based on nodes and edges included in the plurality of historical knowledge graphs, wherein attention measures are generated for respective ones of the edges by processing, for each of the edges, weighted edge information for that edge and associated weighted first and second node information for respective first and second nodes connected by that edge, utilizing a rectified linear unit of the attention-based activation mechanism, and further wherein the subgraphs are determined based on the attention measures;

applying the subgraphs to a first neural network of the processor-based machine learning system, the first neural network being configured to determine node embeddings for respective nodes of the subgraphs;

determining, in the processor-based machine learning system, statistical embeddings for the respective nodes of the subgraphs, wherein each of the statistical embeddings is generated by expanding a dimension of statistical information associated with a corresponding one of the nodes through application of a designated function to the statistical information, the designated function generating respective different positional entries of the statistical embedding from the statistical information;

combining, in the processor-based machine learning system, the node embedding with the statistical embedding for the respective nodes of the subgraphs, to generate respective corresponding combined embeddings;

applying the combined embeddings to a second neural network of the processor-based machine learning system, the second neural network comprising a plurality of graph convolutional networks coupled to respective ones of a plurality of gated recurrent units, with the graph convolutional networks and the gated recurrent units being collectively configured to determine a sequence feature associated with the historical sequence of the knowledge graphs based on the plurality of subgraphs, by processing at least a portion of the combined embeddings generated for the respective nodes of the subgraphs; and training a prediction model of the processor-based machine learning system based on the sequence feature such that the prediction model can describe a correlation among the plurality of historical knowledge graphs, wherein the prediction model comprises a multi-layer perceptron.

* * * * *